United States Patent [19]

Nelle

[11] Patent Number: 4,479,304
[45] Date of Patent: Oct. 30, 1984

[54] FASTENING ELEMENT FOR LENGTH MEASURING DEVICE

[75] Inventor: Günther Nelle, Bergen, Fed. Rep. of Germany

[73] Assignee: Dr. Johannes Heidenhain GmbH, Traunreut, Fed. Rep. of Germany

[21] Appl. No.: 487,211

[22] Filed: Apr. 21, 1983

[30] Foreign Application Priority Data

May 21, 1982 [DE] Fed. Rep. of Germany ....... 3219083

[51] Int. Cl.³ ............................................. G01B 11/04
[52] U.S. Cl. ................................................ 33/125 R
[58] Field of Search ............. 33/125 R, 125 T, 125 A, 33/125 C, 484; 356/373; 250/237 G

[56] References Cited

U.S. PATENT DOCUMENTS

| | | | |
|---|---|---|---|
| 4,198,757 | 4/1980 | Nelle | 33/125 C |
| 4,276,696 | 7/1981 | Ernst | 33/125 C X |
| 4,320,578 | 3/1982 | Ernst | 33/125 T |

FOREIGN PATENT DOCUMENTS 2853771 12/1978 Fed. Rep. of Germany .

Primary Examiner—Harry N. Haroian
Attorney, Agent, or Firm—Willian, Brinks, Olds, Hofer, Gilson & Lione Ltd.

[57] ABSTRACT

A length measuring device is disclosed which includes a housing which encapsulates a measuring scale and a scanning unit. This housing is fastened by means of fastening elements to one of the objects, the position of which is to be measured. One of the two fastening elements directly connects the housing to the object to be measured, while the other fastening element is provided with an array of slits running in a meander pattern and oriented substantially perpendicularly to the measuring direction. This array of slits provides the respective fastening element with a translatory degree of freedom oriented in the longitudinal direction of the housing.

4 Claims, 2 Drawing Figures

FASTENING ELEMENT FOR LENGTH MEASURING DEVICE

BACKGROUND OF THE INVENTION

The present invention relates to an improved mounting means for a length measuring instrument of the type including a carrier which defines first and second ends, a measuring scale mounted to the carrier to extend along a measuring direction, a scanning unit positioned to scan the scale, and means for mounting the first and second ends of the carrier to a first object, the position of which is to be measured.

West German DE OS No. 28 53 771 discloses a length measuring instrument which includes a scale mounted to a carrier. This carrier is connected at one end directly to a machine component by means of a first fastening element. The other end of the carrier is fastened to the machine component by means of a balancing element which provides a translatory degree of freedom to the second end of the carrier. This translatory degree of freedom is oriented in the measuring direction, along the length of the carrier. As shown in FIG. 3 of this patent, the balancing element is made up of a tongue which is pivotable to a limited extent about an axis perpendicular to the measuring direction, but which is resistant to motion transverse to the measuring direction.

SUMMARY OF THE INVENTION

The present invention is directed to an improved fastening element for a length measuring device of the type described above, which provides the desired translatory degree of freedom for one end of the scale carrier with reduced requirements for mechanical elements.

According to this invention, a length measuring instrument of the type described above is provided with means for mounting the second end of the carrier to the first object to provide a translatory degree of freedom extending along a measuring direction. As described below, this mounting means includes a fastening element which is secured to the second end of the carrier and which defines a first region and a second region disposed between the first region and the carrier. Means are provided for securing the first region of the fastening element to the first object, and means are provided for defining an array of slits in the second region of the fastening element. This array of slits is arranged in a meander pattern oriented substantially perpendicularly to the measuring direction.

An important advantage of this invention is that the desired translatory degree of freedom can be provided by an integral component of the fastening element. In this way, a simpler and more economical construction is provided. Since no additional pieces or elements are required for the preferred embodiment of the fastening element of this invention, the cost of the length measuring instrument is reduced, and the number of parts of the length measuring instrument and problems related to the stocking of spare parts, are simplified.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENTS

Figure 1:
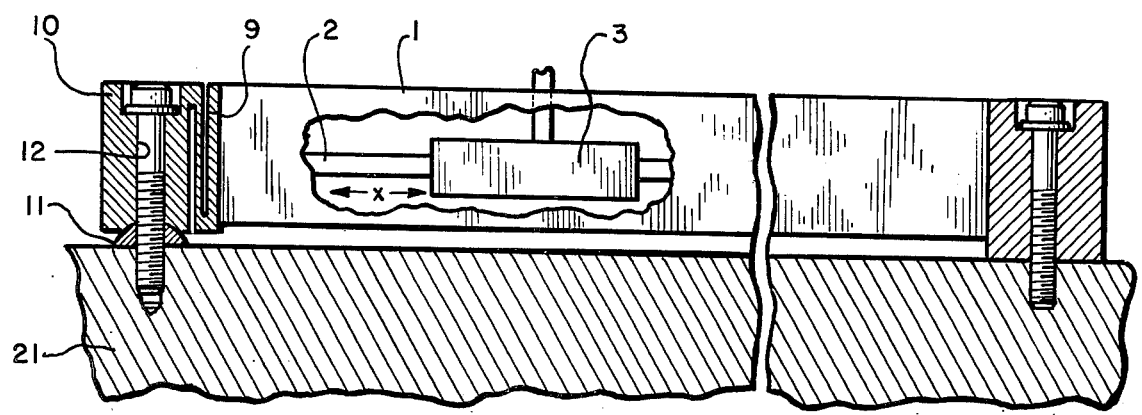
FIG. 1 is a schematic representation in partial section and cutaway of a length measuring instrument suitable with this invention.

Turning now to the drawings, FIG. 1 shows a schematic representation of a length measuring instrument suitable for use with this invention. This length measuring instrument is conventional except for the fastening element to be described in detail below in connection with FIG. 2. It is therefore not necessary to describe this measuring instrument in any great detail. Here, it should be enough to state that the measuring instrument includes a carrier or housing 1 which serves to encapsulate a scale 2 which extends along a measuring direction, along the length of the carrier 1. A scanning unit 3 is positioned within the housing 1 to scan the scale 2, and in use the scanning unit 3 is coupled to a first object (not shown), the position of which is to be measured with respect to a second object 21. The carrier 1 defines first and second ends, and in this illustrative example, the first end of the carrier 1 is rigidly secured to the object 21.

Figure 2:
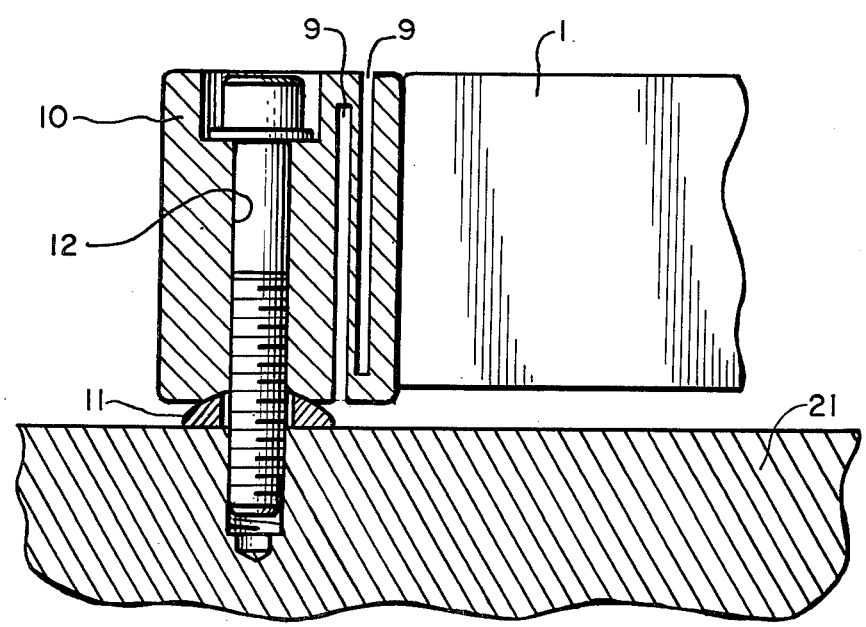
FIG. 2 is an enlarged sectional view of the presently preferred embodiment of the fastening element of this invention.

Turning now to FIG. 2, the present invention is directed to an improved fastening element for mounting the second end of the carrier 1 to the object 21. This fastening element 10 is formed as a balancing element which provides a limited degree of translatory movement to the second end of the carrier 1 along the measuring direction X. This fastening element 10 is rigidly secured to the second end of the carrier 1 and defines two regions: a first region which defines a bore 12, and a second region which defines two opposed, parallel slits 9. These slits 9 are oriented transversely to the measuring direction X, and each of the slits is in communication with a respective opposed side of the fastening element 10. The slits 9 run in a meander pattern oriented perpendicularly to the measuring direction. As used herein, the term "meander pattern" will be used to designate at least two partially overlapping slits arranged to create at least one band of material which is connected at opposite ends to the fastening element 10.

The array of slits 9 provides a translatory degree of freedom for the carrier 1 along the longitudinal measuring direction. During use, changes in temperature of the carrier 1 will typically result in length changes of the carrier 1 which would, unless compensated for, generate substantial longitudinal forces on the carrier 1. The translatory degree of freedom provided by the slits 9 ensures that such thermal length changes do not generate distorting longitudinal forces on the carrier 1.

The fastening element at the first end of the carrier 1 is in this preferred embodiment directly and rigidly connected both to the carrier 1 and to the first object 21, without the use of a balancing element similar to that shown in FIG. 2.

If desired, either the fastening element 10 of FIG. 2, which is provided with slits 9, or the fastening element at the opposite end of the carrier 1 can be fixedly connected to the object 21 by means of a ball joint element 11. As shown in FIG. 2, this ball joint element 11 can be provided with a central opening through which a fastener is allowed to pass. The rounded surface of the ball joint element 11 is shaped to fit within a mating recess defined by the respective fastening element.

It should be understood that the use of a ball joint element is not always required in connection with this invention. Since the fastening element 10, which includes the slits 9, allows a slight angular movement in a plane parallel to the measuring direction and perpendicular to the surface of the object 21, the use of a ball joint element 11 is often not required.

Of course, it should be understood that a wide range of changes and modifications to the preferred embodiment described above will be apparent to those skilled in the art. For example, the fastening element of this invention can be used with the widest variety of measuring instruments. Furthermore, in some embodiments it may be preferable to use three or more parallel slits arranged in a meander pattern rather than the two slit arrangement illustrated above. It is therefore intended that the foregoing detailed description be regarded as illustrative rather than limiting, and that it be understood that it is the following claims, including all equivalents, which are intended to define the scope of this invention.

I claim:

1. In a length measuring instrument for measuring the position of first and second objects; said instrument comprising: a carrier which defines first and second ends, a measuring scale mounted to the carrier to extend along a measuring direction, a scanning unit positioned to scan the scale, and means for fastening the first end of the carrier to the first object; the improvement comprising:

means for mounting the second end of the carrier to the first object to provide a translatory degree of freedom extending along the measuring direction, said means for mounting the second end of the carrier comprising:

a fastening element secured to the second end of the carrier, said element defining a first region and a second region disposed between the first region and the carrier;

means for securing the first region of the fastening element to the first object; and means for defining an array of slits in the second region of the fastening element, said array of slits arranged in a meander pattern oriented substantially transversely to the measuring direction.

2. The invention of claim 1 wherein one of the means for mounting the first end and the means for mounting the first region comprises a ball joint positioned to accommodate skewing between the respective mounting means and the first object.

3. In a length measuring instrument for measuring the position of first and second objects, said instrument comprising: a carrier which defines first and second ends, a measuring scale mounted to the carrier to extend along a measuring direction, a scanning unit positioned to scan the scale, and means for fastening the first end of the carrier to the first object; the improvement comprising:

a one-piece, integrally formed fastening element secured to the second end of the carrier, said element defining a bore extending through the element, a first slit extending partially through the element from a first side of the element, and a second slit extending partially through the element from a second side of the element, opposed to the first side, said first and second slits oriented parallel to one another in a meander pattern, substantially transversely to the measuring direction, in order to provide a translatory degree of freedom to the second end of the carrier along the measuring direction; and a fastener positioned in the bore to fasten the element to the first object.

4. The invention of claim 3 further comprising:

means, included in the element, for defining a recess at one end of the bore adjacent the first object; and a ball joint element which defines a first surface adapted to contact the first object, a rounded second surface adapted to fit into the recess, and a central opening adapted to receive the fastener;

said recess and ball joint element cooperating to form a ball joint and to space the fastening element from the first object.

* * * * *